United States Patent
Orsley (10) Patent No.: US 9,141,230 B2
(45) Date of Patent: Sep. 22, 2015

(54) OPTICAL SENSING IN DISPLACEMENT TYPE INPUT APPARATUS AND METHODS

(75) Inventor: Timothy James Orsley, San Jose, CA (US)

(73) Assignee: Avaoo Technologies General IP (Singapore) Pte. Ltd., Singapore (SG)

( * ) Notice: Subject to any disclaimer, the term of this patent is extended or adjusted under 35 U.S.C. 154(b) by 2884 days.

(21) Appl. No.: 11/512,976

(22) Filed: Aug. 30, 2006

(65) Prior Publication Data

US 2008/0055275 A1    Mar. 6, 2008

(51) Int. Cl.
G09G 5/00    (2006.01)
G06F 3/042   (2006.01)

(52) U.S. Cl.
CPC .................. *G06F 3/0421* (2013.01)

(58) Field of Classification Search
USPC ......................... 345/175, 161, 166
See application file for complete search history.

(56) References Cited

U.S. PATENT DOCUMENTS

| | | | |
|---|---|---|---|
| 5,164,713 A * | 11/1992 | Bain | 715/862 |
| 5,793,354 A * | 8/1998 | Kaplan | 345/157 |
| 5,889,507 A | 3/1999 | Engle et al. | |
| 6,373,047 B1 * | 4/2002 | Adan et al. | 250/221 |
| 6,657,559 B1 | 12/2003 | Li | |
| 6,667,733 B2 | 12/2003 | Miyoshi | |
| 6,753,848 B2 | 6/2004 | Toshiharu | |
| 6,765,557 B1 | 7/2004 | Segal et al. | |
| 7,061,468 B2 | 6/2006 | Tiphane et al. | |
| 7,660,455 B2 * | 2/2010 | Yamamoto et al. | 382/141 |
| 2002/0149509 A1 | 10/2002 | Kim et al. | |
| 2004/0032392 A1 | 2/2004 | Chi et al. | |
| 2004/0108993 A1 | 6/2004 | Suzuki et al. | |
| 2004/0130531 A1 * | 7/2004 | Cheng | 345/163 |
| 2005/0110755 A1 | 5/2005 | Harley et al. | |
| 2006/0026536 A1 | 2/2006 | Hotelling et al. | |
| 2006/0152491 A1 | 7/2006 | Lian | |
| 2007/0126700 A1 * | 6/2007 | Wright | 345/161 |

* cited by examiner

*Primary Examiner* — William Boddie
*Assistant Examiner* — Leonid Shapiro (57) ABSTRACT

In an input apparatus, an input system includes a displaceable member movable in an operational zone and a tracking surface that moves in correlation with movement of the displaceable member. An optical sensor has a field of view of at least a portion of the tracking surface during movement of the displaceable member in the operational zone and generates optical data in response to light received from the tracking surface. A processing system produces motion measures indicative of movement of the tracking surface from the optical data. In an input method, optical data is generated in response to light received from a field of view of at least a portion of a tracking surface that moves in correlation with movement of a displaceable member during movement of the displaceable member in an operational zone. Motion measures indicative of movement of the tracking surface are produced from the optical data.

17 Claims, 9 Drawing Sheets

OPTICAL SENSING IN DISPLACEMENT TYPE INPUT APPARATUS AND METHODS

BACKGROUND

Many different types of pointing devices have been developed for inputting commands into a machine. For example, hand-manipulated pointing devices, such as computer mice, joysticks, trackballs, touchpads, and keyboards, commonly are used to input instructions into a computer by manipulating the pointing device. Such pointing devices allow a user to control movement of a cursor (i.e., a virtual pointer) across a computer screen, select or move an icon or other virtual object displayed on the computer screen, and open and close menu items corresponding to different input commands.

Pointing devices have been developed for large electronic devices, such as desktop computers, which are intended to remain stationary, and for small portable electronic devices, such as cellular telephones and mobile computer systems. Pointing devices for large electronic devices typically have fewer and more flexible design constraints than pointing devices for portable electronic devices because of the greater space and power resources that are available. In general, a pointing device for use in portable electronic devices should allow a user to move a cursor quickly and accurately, operate in an intuitive fashion, and operate within limited workspace and power constraints.

Displacement type pointing devices have been developed to meet the constraints inherent in portable electronic devices. These types of pointing devices include a displaceable member (e.g., a puck, button, or other movable body) that moves in a defined field of motion upon application of force by, for example, a user's finger. In a typical displacement-type pointing device, the displaceable member moves in two dimensions in response to lateral forces that are directed in a plane. Resistor circuits, capacitive sensors, and magnetic (Hall-effect) sensors have been used to determine the displacement of the displaceable member within the field of motion. The determined displacement of the displaceable member is mapped to two-dimensional motion of a cursor on a display. A restoring mechanism (e.g., a set of springs) typically returns the displaceable member to a central location within the field of motion after the user releases the displaceable member. The position mapping system typically fixes the position of the cursor on the display when the displaceable member is in the central location of the field of motion.

The field of motion of the displaceable member typically is very small. As a result, displacement type pointing devices typically operate in either a relative device-cursor mapping mode or a velocity mapping (or joystick) mode. In a relative device-cursor mapping mode, the position of the displaceable member and the position of the cursor on the display can be offset with a variable mapping. In a velocity mapping mode, the displacement of the displaceable member is mapped to the velocity of the cursor on the display. The field of motion of the displaceable member typically is too small to provide an absolute device-cursor mapping mode in which there is a one-to-one correspondence between the position of the displaceable member and the position of the cursor on the screen.

What are needed are displacement type input apparatus and methods that are capable of sensing movement of the displaceable member with high accuracy, that provide an absolute position mapping mode of input, and that can be readily reconfigured to provide multiple modes of input.

SUMMARY

In one aspect, the invention features an apparatus that includes an input system, an optical sensor, and a processing system. The input system includes a displaceable member movable in an operational zone and a tracking surface that moves in correlation with movement of the displaceable member. The optical sensor has a field of view of at least a portion of the tracking surface during movement of the displaceable member in the operational zone. The optical sensor is operable to generate optical data in response to light received from the tracking surface. The processing system is operable to produce motion measures indicative of movement of the tracking surface from the optical data.

In another aspect, the invention features a method in accordance with which optical data is generated in response to light received from a field of view of at least a portion of a tracking surface that moves in correlation with movement of a displaceable member during movement of the displaceable member in an operational zone. Motion measures indicative of movement of the tracking surface are produced from the optical data.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

Figure 1:
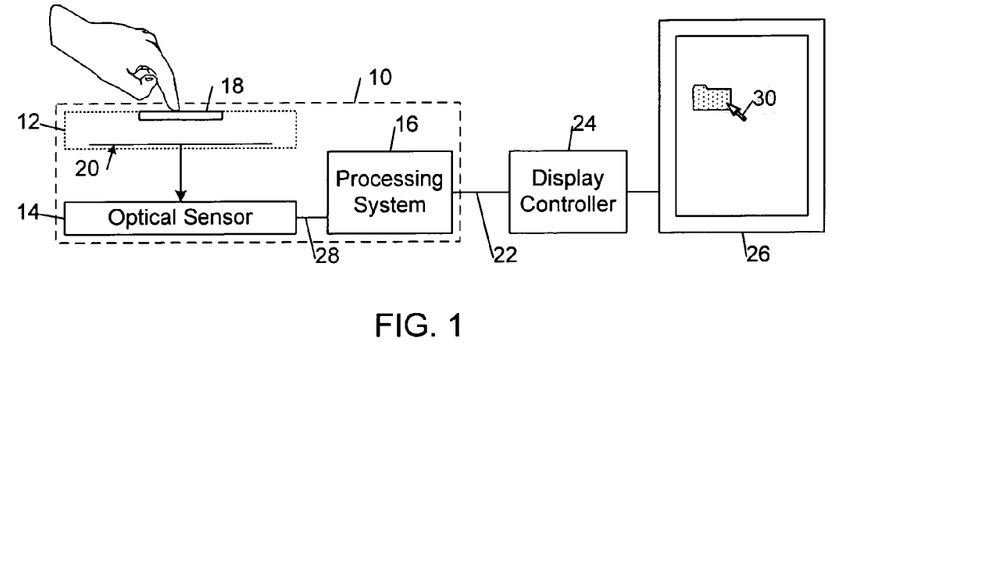
FIG. 1 is a block diagram of an embodiment of an input apparatus that includes an input system, an optical sensor, and a processing system in an exemplary operational environment.

FIG. 1 shows an embodiment of an input apparatus 10 that includes an input system 12, an optical sensor 14, and a processing system 16. The input system 12 includes a displaceable member 18 and a tracking surface 20 that moves in correlation with movement of the displaceable member 18. In some embodiments, the tracking surface 20 is a surface of the displaceable member 18. In other embodiments, the tracking surface 20 is a surface of a separate structure that is mechanically coupled to the displaceable member 18. As explained in detail below, the input apparatus 10 is capable of sensing movement of the displaceable member 18 with high accuracy, provides an absolute position mapping mode of input in which the positions of the displaceable member 18 are mapped to positions of a cursor with a one-to-one correspondence, and can be readily reconfigured to provide multiple modes of input. In general, the input apparatus 10 may be incorporated into any type of device or system in which inputting control signals serves a useful purpose. For illustrative purposes, the input apparatus 10 is described herein as a component of a device for inputting graphical user interface commands into a machine.

In the illustrative operational environment shown in FIG. 1, the input apparatus 10 outputs display control signals 22 to a display controller 24 that drives a display 26. The display control signals 22 typically are in the form of motion measures that are derived from optical data 28 that is produced by the optical sensor 14. The motion measures typically correspond to one or more of position parameter values, displacement parameter values, velocity parameter values, and acceleration parameter values. The display controller 24 processes the display control signals 22 to control, for example, the movement of a cursor on the display 26. The display controller 24 typically executes a driver to process the display control signals 22. In general, the driver may be implemented in any computing or processing environment, including in digital electronic circuitry or in computer hardware, firmware, or software. In some embodiments, the driver is a component of an operating system or a software application program. The display 26 may be, for example, a flat panel display, such as a LCD (liquid crystal display), a plasma display, an EL display (electro-luminescent display) and a FED (field emission display).

In some embodiments, the input apparatus 10 and the display 26 are implemented as separate discrete devices, such as a separate pointing device and a remote display-based system. In these embodiments, the remote system may be any type of display-based appliance that receives user input, including a general-purpose computer system, a special-purpose computer system, and a video game system. The display control signals 22 may be transmitted to the remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). In other embodiments, the input apparatus 10 and the display 26 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console.

Figure 2:
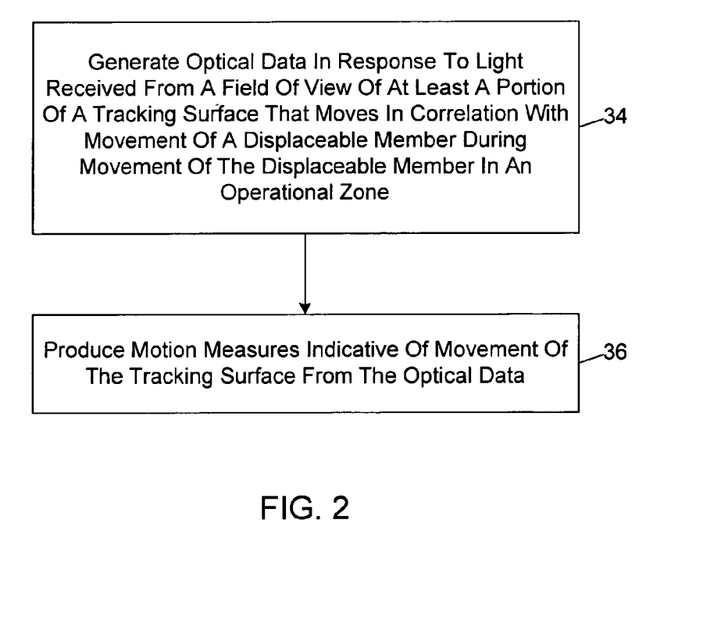
FIG. 2 is a flow diagram of an embodiment of an input method.

FIG. 2 shows a flow diagram of an embodiment of an input method that is implemented by the input apparatus 10 shown in FIG. 1.

In accordance with this method, the optical sensor 14 generates the optical data 28 in response to light received from a field of view of at least a portion of a tracking surface 20 that moves in correlation with movement of a displaceable member 18 during movement of the displaceable member 18 in an operational zone (FIG. 2, block 34). The optical sensor 14 typically is implemented by imaging device that is capable of generating optical data 28 that corresponds to one-dimensional or two-dimensional images of the tracking surface 20. Exemplary imaging devices of this type include one-dimensional and two-dimensional CMOS (Complimentary Metal-Oxide Semiconductor) image sensors, and CCD (Charge-Coupled Device) image sensors.

The processing system 16 produces motion measures that are indicative of movement of the tracking surface 20 from the optical data 28 (FIG. 2, block 36). In some embodiments, the processing system 16 produces the motion measures from comparisons of ones of the images that are captured by the optical sensor 14. In operation, the processing system 16 detects relative movement between the optical sensor 14 and the tracking surface 20 based on comparisons between images of the tracking surface 20 that are captured by the optical sensor 14. In some implementations, the processing system 16 correlates features that are identified in successive ones of the images to provide information relating to the positions of the tracking surface 20 relative to the optical sensor 14. In general, the features may correspond to texture, speckle, or other identifiable elements the images. These features may be, for example, inherent to the tracking surface 20, relief patterns embossed on the tracking surface 20, or marking patterns printed on the tracking surface 20. In general, any type of correlation method may be used to track the positions of common features across successive ones of the images. In some embodiments, a sum of squared differences correlation method is used to find the locations of identical features in successive images in order to determine the displacements of the features across the captured images. In some of these embodiments, the displacements are summed or integrated over a number of images. The resulting integration values may be scaled to compensate for any image scaling by the optics associated with the image sensor 14. The processing system 16 translates the displacement information into two-dimensional relative motion vectors that describe the relative movement of the tracking surface 20 and, hence, the relative movement of the displaceable member 18 whose movements are correlated with the movements of the tracking surface 20.

In some embodiments, the processing system 16 generates the display control signals 22 from the movement measures. In some of these embodiments, the display control signals 22 correspond exactly to the movement measures. In other ones of these embodiments, the display control signals 22 are derived (or translated) from the movement measures. Examples of the types of display control signals 22 that may be produced by the processing system 16 include: position data (e.g., distance along the axes of a coordinate system centered at a designated origin of the operational zone) that describe the relative position of the displaceable member 18; velocity data that describe the velocity of the displaceable member 18; and scrolling position and distance data.

The processing system 16 may be implemented by one or more discrete modules that are not limited to any particular hardware or software configuration. The one or more modules may be implemented in any computing or processing environment, including in digital electronic circuitry (e.g., an application-specific integrated circuit, such as a digital signal processor (DSP)) or in computer hardware, firmware, device driver, or software. In some implementations, computer process instructions for implementing the modules of the process system 16 and the data generated by these modules are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD/DVD-ROM.

II. Exemplary Embodiments of the Input Apparatus

A. Exemplary Input System Embodiments

In some embodiments, the input system 12 includes a support structure that constrains the displaceable member 18 to two-dimensional movement within the operational zone. In some embodiments, the movement directions of the tracking surface 20 and the displaceable member 18 are identical for movements of the displaceable member 18 along at least one axis in the operational zone. In other embodiments, the movement directions of the tracking surface 20 and the displaceable member 18 are different for movements of the displaceable member 18 along at least one axis in the operational zone.

Figure 3:
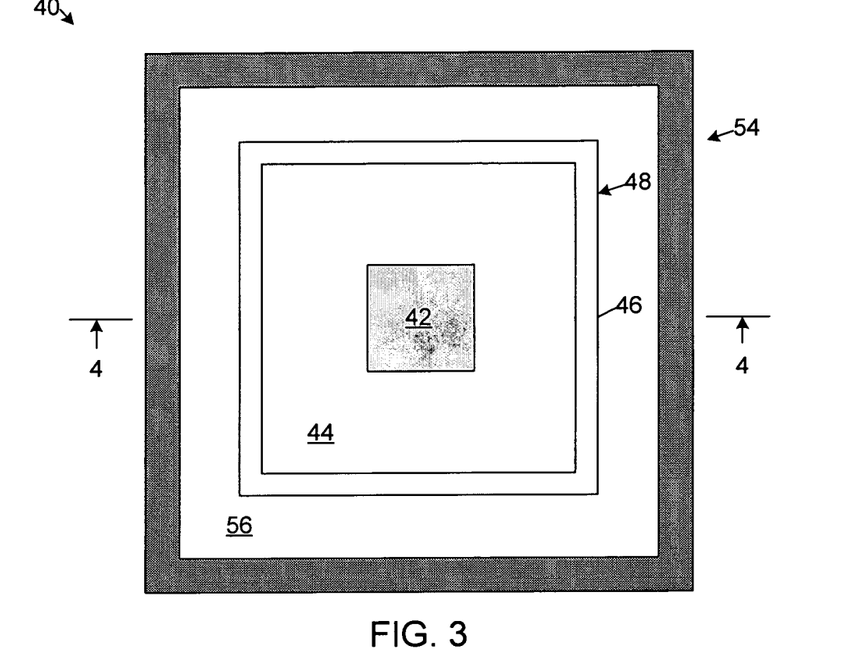
FIG. 3 is a diagrammatic top view of an embodiment of the input apparatus shown in FIG. 1.
Figure 4:
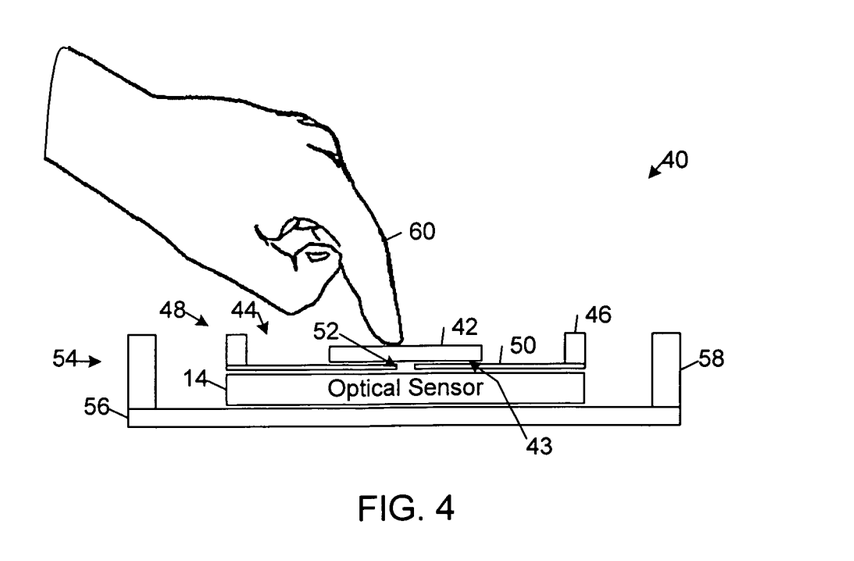
FIG. 4 is a cross-sectional side view of the input apparatus shown in FIG. 3 taken along the line 4-4.

FIG. 3 shows a top view of components of an exemplary embodiment 40 of the input apparatus 10 and FIG. 4 shows a cross-sectional side view of the input apparatus 40 taken along the line 4-4.

In the input apparatus 40, the displaceable member 18 is implemented by a sliding body 42 and the tracking surface 20 is implemented by a bottom surface 43 of the sliding body 42. The sliding body 42 is slidable over a support surface 50) within an operational zone 44. In general, the operational zone 44 may be any shape, including a polygonal shape (e.g., a square shape as shown or a rectangular shape) and a curved shape (e.g., an elliptical shape and circular shape). In the embodiment shown in FIGS. 3 and 4, the operational zone 44 is defined by walls 46 of a support structure 48 that includes the support surface 50.

In some embodiments, a mechanical or magnetic mechanism constrains the sliding body 42 to movement on the support surface 50. For example, in some exemplary embodiments, the sliding body 42 is magnetically attracted to the support surface 50. In these embodiments one or both of the sliding body 42 and the support surface 50 may include a respective permanent magnet.

The tracking surface 43 may be illuminated by ambient light or a light source (e.g., a light-emitting diode) adjacent the optical sensor 14. The support surface 50 includes an optical port 52 through which the optical sensor 14 receives light reflected from the tracking surface 43. The support structure 48 is mounted in a housing 54 that includes a substrate 56 and sidewalls 58. The optical sensor 14 is supported underneath the support structure 48 on the substrate 56. The sliding body 42 typically is sized so that at least a portion of the tracking surface 43 is viewable through the optical port 52 in all positions of the sliding body 42 within the operational zone 44. In operation, the sliding body 42 moves laterally (i.e., in the plane of the support surface 50) in response to the application of a lateral force by a user's finger 60. The optical sensor 14 generates the optical data 28 in response to light received from the tracking surface 43 through the optical port 52.

Figure 5:
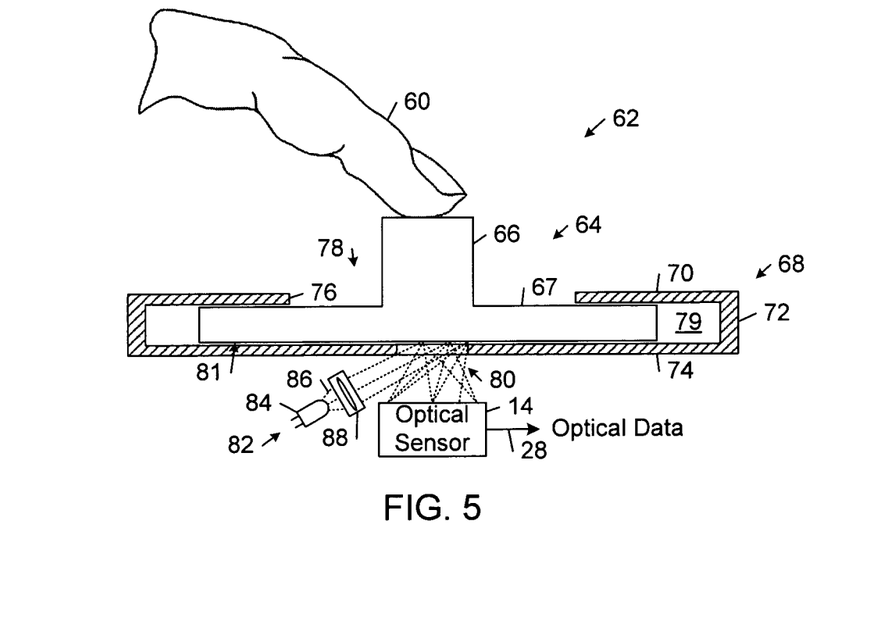
FIG. 5 is a cross-sectional side view of components of an embodiment of the input apparatus shown in FIG. 1.

FIG. 5 shows an embodiment 62 of the input system of the input apparatus 40 shown in FIG. 4. In this embodiment, the sliding body 42 is implemented by an input mechanism 64 that includes a handle 66 and a base 67, and the support structure 48 is implemented by a housing 68 that includes a top 70, sidewalls 72, and a bottom 74. The top 70 includes sidewalls 76 that define an opening 78 through which the handle 66 protrudes. The operational zone of the sliding body 64 typically is defined by the range of motion of the handle 66 within the opening 78. The base 67 of the sliding body 64 is free to slide laterally within a cavity 79 that is formed between the sidewalls 72, the top 70, and the bottom 74 of the housing 68. The top 70 and the bottom 74 of the housing 68 constrain the base 67 to two-dimensional movement within the cavity 79.

The bottom 74 of the housing 68 includes an optical port 80 through which the optical sensor 14 receives light from a tracking surface 81. In the illustrated embodiment, an optional illumination system 82 illuminates the portion of the tracking surface 81 that is visible through the optical port 80. The optical illumination system 82 includes a light source 84 (e.g., a light emitting diode or a laser) that produces light 86 within a target wavelength range and an optical element 88 directs the light 86 toward the tracking surface 81. A portion of the light 86 that is scattered by the tracking surface 81 is captured by the optical sensor 14.

Figure 6:
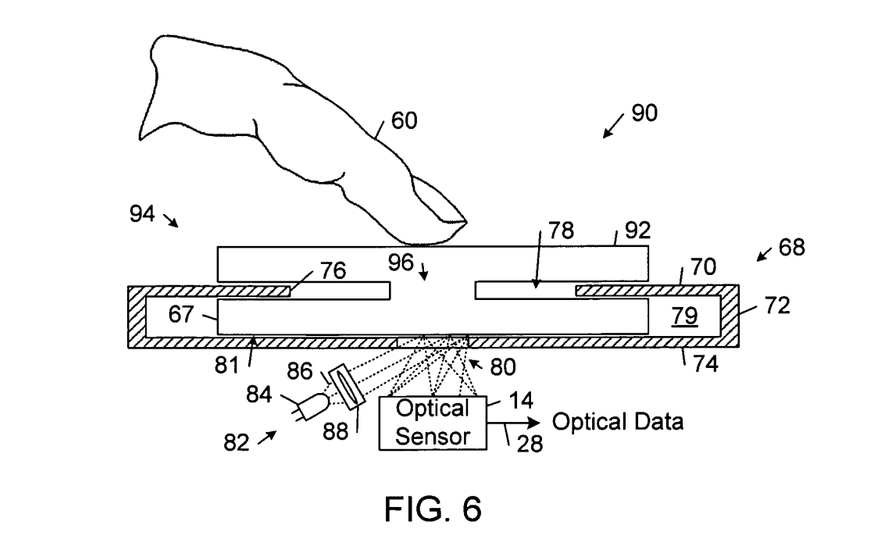
FIG. 6 is a cross-sectional side view of components of an embodiment of the input apparatus shown in FIG. 1.

FIG. 6 shows an embodiment 90 of the input system of the input apparatus 40 shown in FIG. 4. The input system 90 corresponds to the embodiment 62 shown in FIG. 5, except that the handle 66 of the input mechanism 64 is implemented by a puck 92 portion of a sliding body 94. The puck portion 92 is connected to the base 67 by a coupling portion 96. In this embodiment, the operational zone of the sliding body 94 typically is defined by the range of motion of the coupling portion 96 within the opening 78. The base 67 of the sliding body 94 is free to slide laterally within the cavity 79 that is formed between the sidewalls 72, the top 70, and the bottom 74 of the housing 68. The top 70 and the bottom 74 of the housing 64 constrain the base 67 to two-dimensional movement within the cavity 79.

Figure 7:
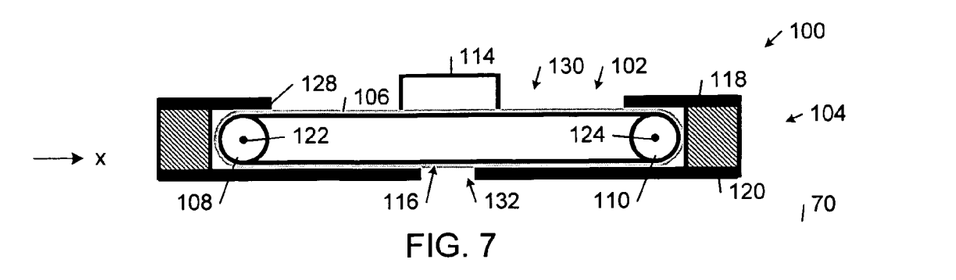
FIG. 7 is a cross-sectional side view of an embodiment of an input system of the input apparatus shown in FIG. 1.
Figure 8A:
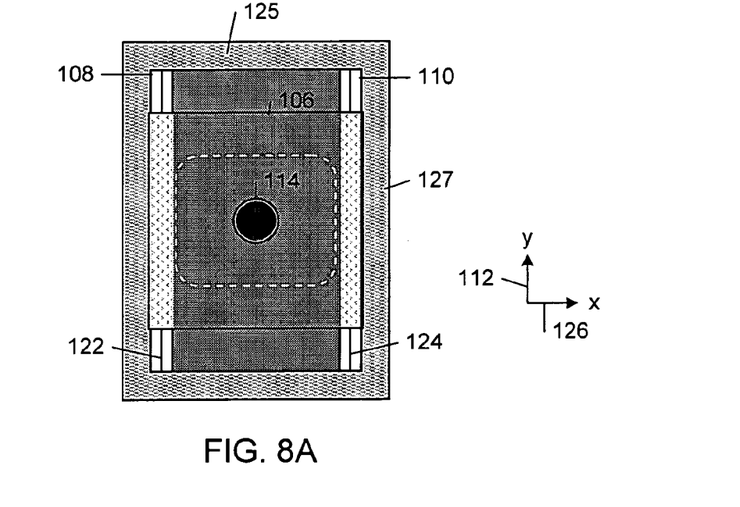
FIG. 8A is a diagrammatic top view of a support structure of the input apparatus shown in FIG. 7.
Figure 8B:
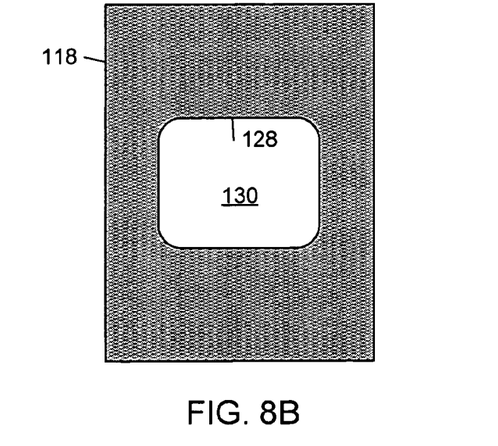
FIG. 8B is a diagrammatic top view of a top plate of the input system shown in FIG. 7.
Figure 8C:
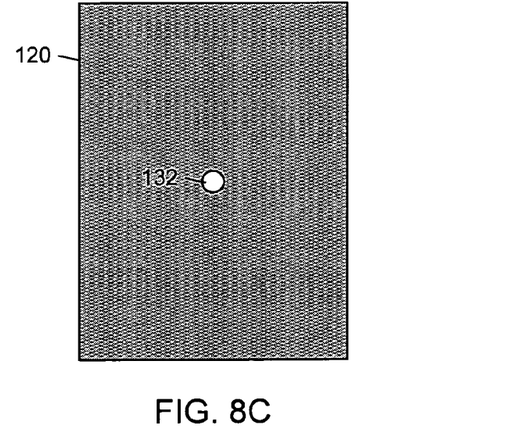
FIG. 8C is a diagrammatic bottom view of a bottom plate of the input system shown in FIG. 7.

FIG. 7 shows a cross-sectional view of an embodiment 100 of the input system 12 that includes a support structure 102 and a housing 104. FIG. 8A shows a top view of the support structure 102. FIG. 8B shows a top view of a top side 118 of the housing 104. FIG. 8C shows a bottom view of a bottom side 120 of the housing 114.

The support structure 102 includes a continuous belt 106 that is configured to rotate about first and second rollers 108, 110, which have respective rotational axes that are parallel to a first coordinate axis 112 (i.e., the y-axis). A displaceable member 114 is attached to a first portion of the belt 106 facing the top side 118 of the housing 104 and a tracking surface 116 corresponds to a second portion of the belt 106 facing the bottom side 120 of the housing 104. The first and second rollers 108, 110 are supported on first and second shafts 122, 124, respectively. The first and second shafts 122, 124 are mounted on a frame 125 that, in turn, is mounted on a base 127. The first and second rollers 108, 110 are configured to slide on the first and second shafts in directions parallel to the first coordinate axis 112 (i.e., the y-axis).

In operation, sliding movements of the rollers 108, 110 along the shafts 122, 124 causes the displaceable member 114 to move in directions parallel to the first coordinate axis 112 (i.e., the y-axis). On the other hand, rotation of the rollers 108, 110 about their rotational axes causes the displaceable member 114 to move in directions parallel to a second coordinate axis 126 (i.e., the x-axis), which is orthogonal to the first coordinate axis 112. In this embodiment, the movement directions of the tracking surface 116 and the displaceable member 114 are the same for movements of the displaceable member 114 along the first coordinate axis 112 (i.e., the y-axis). The movement directions of the tracking surface 116 and the displaceable member 114 are different for movements of the displaceable member 114 in directions that are not parallel to the first coordinate axis 112. For example, the movements directions of the tracking surface 116 and the displaceable member 114 are opposite for movements of the displaceable member 114 along the second coordinate axis 126 (i.e., the x-axis).

The top side 118 of the housing 104 includes sidewalls 128 that define an opening 130 through which the displaceable member 114 protrudes. The operational zone of the displaceable member 114 typically is defined by its range of motion within the opening 130. The bottom side 120 of the housing 104 includes an optical port 132 through which the optical sensor 14 receives light from the tracking surface 116.

B. Exemplary Display Control Signal Production Methods

Figure 9A:
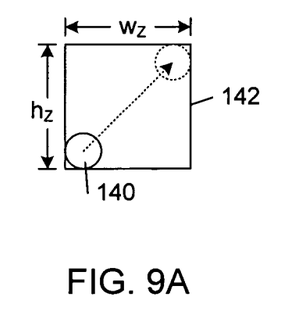
FIG. 9A is a diagrammatic view of a displaceable member being moved from a first position to a second position in an operational zone in an embodiment of the input apparatus shown in FIG. 1.
Figure 9B:
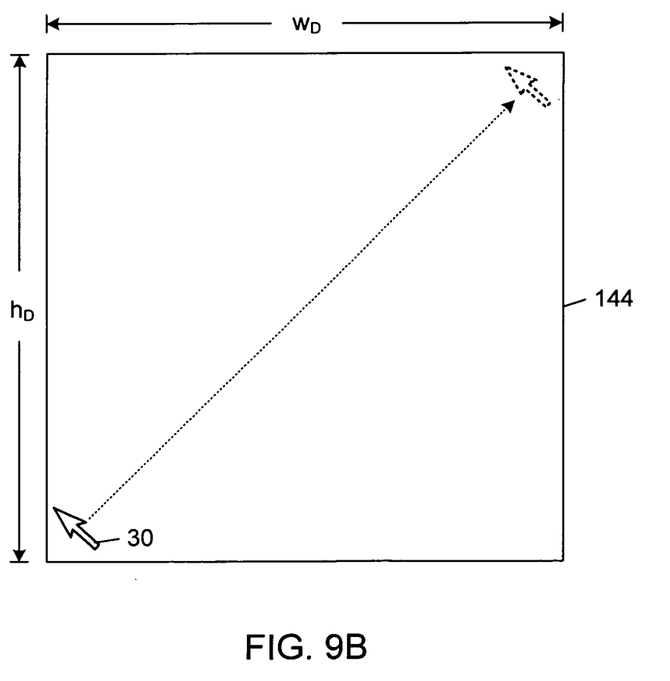
FIG. 9B is a diagrammatic view of a cursor being moved from a first position to a second position in a display screen in response to the displaceable member movement shown in FIG. 9A in accordance with an embodiment of an absolute position mapping input method.

FIG. 9A depicts an embodiment 140 of the displaceable member 18 (see FIG. 1) being moved from a first position (shown by solid lines) to a second position (shown by dashed lines) in an operational zone 142. FIG. 9B depicts the cursor 30 (see FIG. 1) being moved from a first position (shown by solid lines) to a second position (shown by dashed lines) in an area 144 of the display 26.

In some embodiments, the processing system 16 produces the display control signals 22 so that there is a one-to-one correspondence mapping between the positions of the displaceable member 18 in the operational zone 142 and the positions of the cursor 30 in the display area 144. For example, in accordance with these embodiments, in response to the movement of the displaceable member 140 from the first position to the second position as shown in FIG. 9A, the processing system 16 should produce display control signals that cause the cursor 30 to move from the first position to the second position as shown in FIG. 9B. In this process, the processing system 16 implements an absolute position mapping of the operational zone 142 to the display area 144, where each point of the operational zone 142 corresponds to a respective point in the display area 144. In the illustrated embodiment, the operational zone 142 has width and height dimensions of $w_Z$ and $h_Z$, respectively, and the display area 144 has width and height dimensions of $w_D$ and $h_D$, respectively. In order to implement that absolute position mapping, the processing system 16 determines each point $(x_D, y_D)$ in the display area 144 from the corresponding point $(x_Z, y_Z)$ in the operational zone in accordance with equations (1) and (2):

$$x_D = x_Z \cdot \frac{w_D}{w_Z} \quad (1)$$

$$y_D = y_Z \cdot \frac{h_D}{h_Z} \quad (2)$$

In an absolute position mapping mode of operation, the processing system 16 produces the display control signals 22 corresponding to the display point positions that are determined in accordance with equations (1) and (2).

Figure 10A:
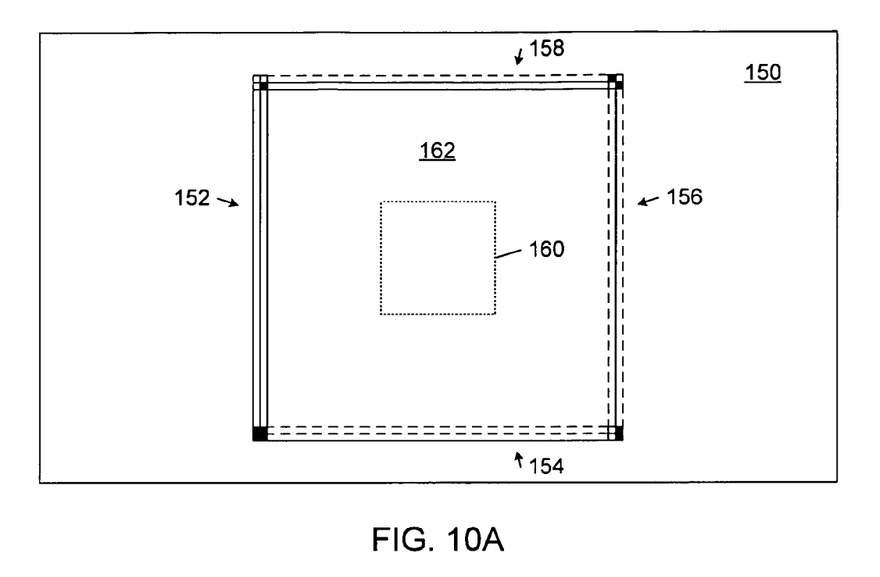
FIG. 10A is a diagrammatic view of an embodiment of a field of view of an optical sensor superimposed on an embodiment of a tracking surface that includes four boundary patterns.

FIG. 10A shows an embodiment 150 of the tracking surface 20 (see FIG. 1) that includes edge boundary patterns 152, 154, 156, 158 that demarcate locations on the tracking surface 150 that are visible in the field of view 160 of the optical sensor 14 when the displaceable member 18 (see FIG. 1) is positioned at corresponding ones of the boundaries of the operational zone. In other words, the edge boundary patterns 152-158 correspond to a on-to-one mapping of the edges of the operational zone of the displaceable member 18 to the corresponding edges of the viewable area 162 of the tracking surface 150 that can be imaged by the optical sensor 14 during movement of the displaceable member 18 throughout the operational zone. For example, in the exemplary embodiment shown in FIG. 10B, in response to movement of the displaceable member 18 against one edge of the operational zone, the tracking surface 150 moves in the direction of arrow 164, causing the edge boundary pattern 152 to appear in the field of view 160 of the optical sensor 14.

The edge boundary patterns 152-158 may be, for example, relief patterns that are embossed on the tracking surface 150 or marking patterns that are printed on the tracking surface 150. Each edge boundary pattern 152-158 uniquely identifies a respective one of the edges of the viewable area 162. In general, the edge boundary patterns 152-158 may be implemented by any type of pattern that uniquely identifies the edges of the viewable area 162. In some exemplary embodiments, the edges of the viewable area 162 are encoded by respective bar code patterns. In the exemplary embodiment shown in FIGS. 10A and 10B, each of the edge boundary patterns 152-158 is encoded by a unique sequence of solid lines and dashed lines. When read sequentially in a direction from the center to the periphery of the field of view 160, the edge boundary patterns 152-158 are encoded as listed in Table 1:

TABLE 1

Figure 10B:
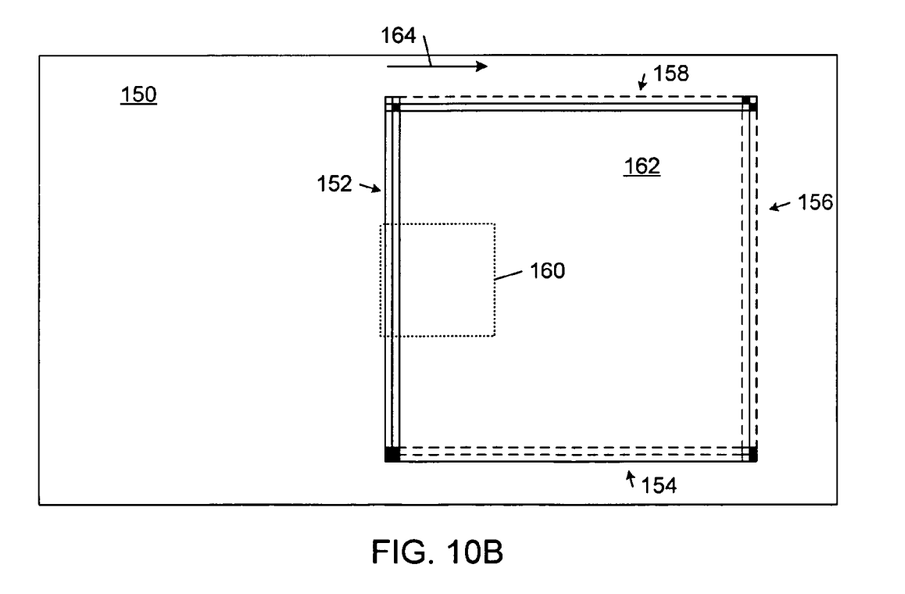
FIG. 10B is a diagrammatic view of the tracking surface shown in FIG. 10A after the tracking surface has moved in relation to the optical sensor field of view.

| BOUNDARY PATTERN | ENCODED LINE SEQUENCE |
| --- | --- |
| left edge 152 | solid-solid-solid |
| bottom edge 154 | dashed-dashed-solid |
| right edge 156 | dashed-solid-dashed |
| top edge 158 | solid-solid-dashed |

In the embodiment shown in FIGS. 10A and 10B, the corner boundaries of the viewable area 162 are uniquely identified by a respective two-by-two dot pattern. When read in clockwise order from the upper left corner of each dot pattern, the corner locations are encoded as listed in Table 2:

TABLE 2

| CORNER LOCATION | ENCODED DOT SEQUENCE |
| --- | --- |
| upper left corner | white-white-black-white |
| upper right corner | black-white-black-white |
| lower right corner | white-black-black-white |
| lower left corner | black-black-black-black |

The boundary patterns (i.e., the edge boundary patterns 152-158 and the corner boundary patterns) are captured in the optical data 28 that is generated by the optical sensor 14. In some embodiments, the processing system 16 is able to automatically calibrate the input apparatus 10 based on the detection of the boundary patterns in the optical data 28. This allows the processing system 16 to automatically correct any deviations from a one-to-one correspondence between the positions of the displaceable member 18 in the operational zone 142 and the positions of the cursor 30 in the display area 144 of the display 26.

Figure 11:
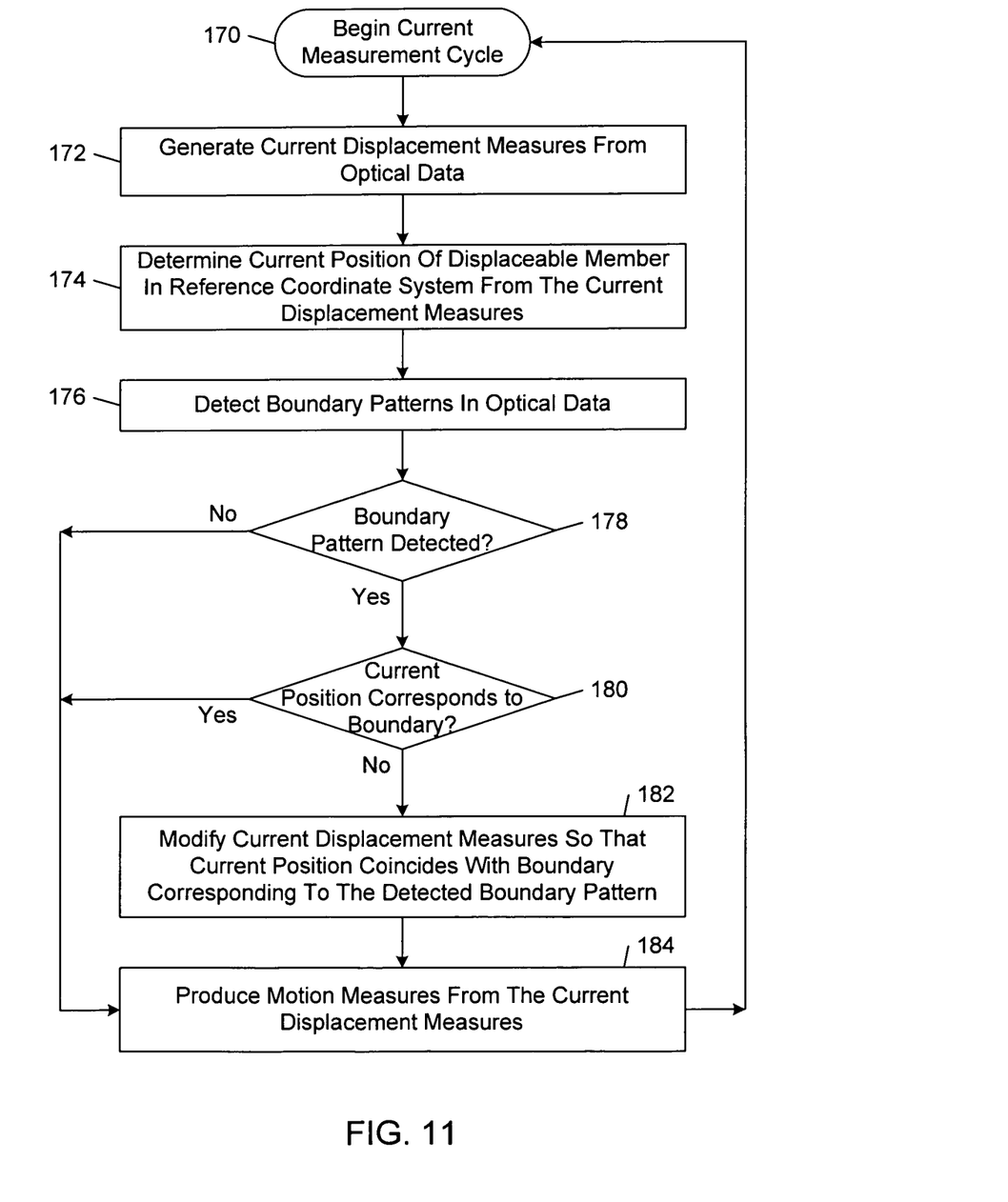
FIG. 11 is a flow diagram of an embodiment of an input method.

FIG. 11 shows an embodiment of an auto calibration input method that is implemented by the processing system 16. This process is implemented for each measurement cycle (FIG. 11, block 170).

The processing system 16 generates a set of displacement measures from the optical data 28 (FIG. 11, block 172). In some embodiments, each of the displacement measures corresponds to a measure of displacement between successive images that are captured by the optical sensor and translated into a reference coordinate system of the displaceable member 18 in the operational zone.

The processing system 16 determines the current position of the displaceable member 18 in the reference coordinate system from the current displacement measures (FIG. 11, block 174). In some embodiments, the processing system 16 iteratively determines the current position $(x(t),y(t))$ of the displaceable member 18 by updating the previous position $(x(t-1),y(t-1))$ of the displaceable member 18 based on the current displacement measures $(\Delta x(t), \Delta y(t))$ in accordance with equations (3) and (4):

$$x(t)=x(t-1)+\Delta x(t) \quad (3)$$

$$y(t)=y(t-1)+\Delta y(t) \quad (4)$$

The processing system 16 determines whether the optical data 28 that is captured during the current measurement cycle contains a boundary pattern (FIG. 11, block 176). If the processing system 16 does not detect a boundary pattern in the optical data 28 (FIG. 11, block 178), the processing system 16 produces the motion measures from the current displacement measures (FIG. 11, block 184) and waits for the next measurement cycle before repeating the process (FIG. 11, block 170).

If the processing system 16 detects a boundary pattern in the optical data 28 (FIG. 11, block 178), the processing system 16 determines whether the current position $(x(t),y(t))$ of the displaceable member 18 is located at the boundary of the operational zone that corresponds to the detected boundary pattern (FIG. 11, block 180). If so, the current position $(x(t),y(t))$ of the displaceable member 18 and the corresponding position reported in the display control signals 22 are correct. In this case, the processing system 16 produces the motion measures from the current displacement measures (FIG. 11, block 184) and waits for the next measurement cycle before repeating the process (FIG. 11, block 170).

If the current position $(x(t),y(t))$ of the displaceable member 18 is not located at the boundary of the operational zone that corresponds to the detected boundary pattern (FIG. 11, block 180), the processing system 16 modifies the displacement measures $(\Delta x(t), \Delta y(t))$ so that the current position $(x(t),y(t))$ of the displaceable member 18 coincides with the boundary in the operational zone corresponding to the detected boundary pattern (FIG. 11, block 182). In some embodiments, the processing system 16 adjusts the displacement measures $(\Delta x(t), \Delta y(t))$ to correspond to the distance between the current position $(x(t),y(t))$ and the known location of the boundary in the operational zone that corresponds to the detected boundary pattern. In some embodiments, when a boundary pattern is detected, the processing system 16 outputs sufficient numbers of $\Delta x$ pulses and $\Delta y$ pulses to guarantee that the cursor is at the location of the corresponding border in the display area. For example, in one implementation, if the processing system 16 has output 1000 pulses in the x-direction before an x-axis boundary pattern was detected but 1024 pulses are required to move the cursor to the corresponding boundary in the display area, the processing system 16 will output an extra 24 pulses upon detection of the x-axis boundary pattern. The processing system 16 produces the motion measures from the current (modified) displacement measures (FIG. 11, block 184) and waits for the next measurement cycle before repeating the process (FIG. 11, block 170).

C. Exemplary Multimode Input Apparatus Embodiments

Some embodiments of the input apparatus 10 are incorporated in a housing that provides multiple modes for users to input commands into a machine.

Figure 12:
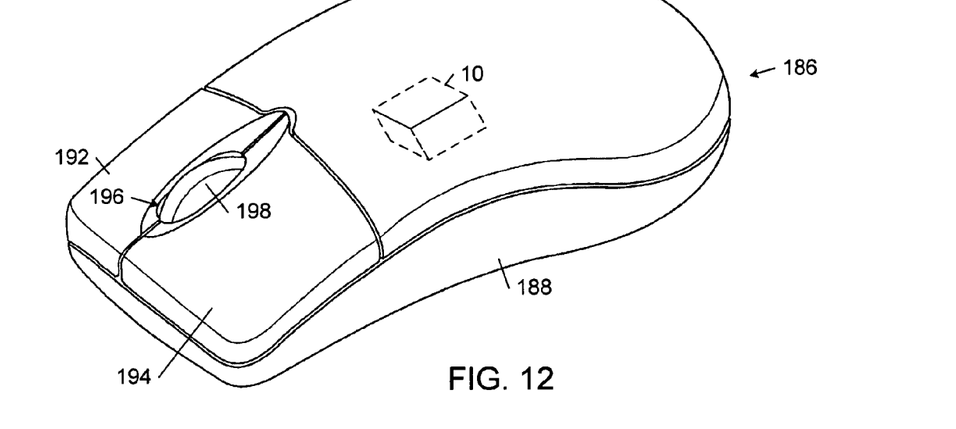
FIG. 12 is a perspective view of an embodiment of a housing containing an embodiment of the input apparatus shown in FIG. 1.

FIG. 12 shows a perspective view of an embodiment of a housing 186 that contains an embodiment of the input apparatus 10. The housing 186 includes a base 188 and a top portion 190. The housing 186 also includes a right input button 192, a left input button 194, and an opening 196 through a rotatable wheel 198 (e.g., a Z-axis control wheel or a Z-wheel) extends. The right input button 192, the left input button 194, and the rotatable wheel 198 may be configured to function in the same way as the corresponding components of a conventional optical mouse.

Figure 13A:
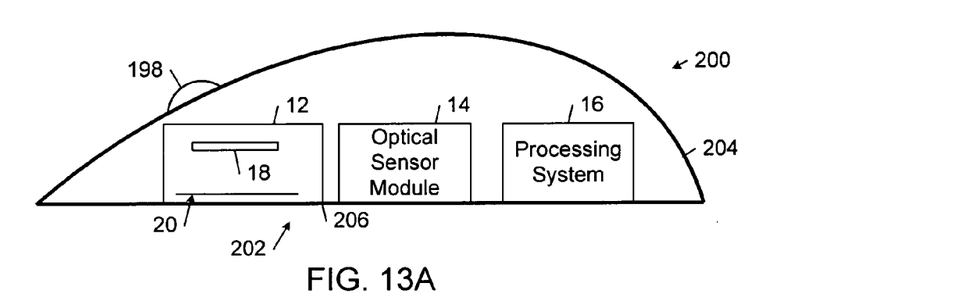
FIG. 13A is a diagrammatic cross-sectional view of an embodiment of a housing containing an embodiment of the input apparatus shown in FIG. 1.
Figure 13B:
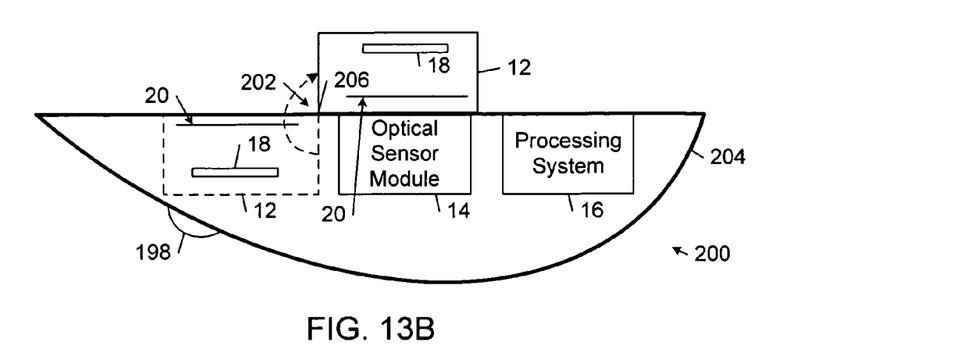
FIG. 13B is a diagrammatic cross-section view of the housing shown in FIG. 13A after the displaceable member has been re-oriented to change the input mode of operation of the input apparatus.

FIGS. 13A and 13B shows an embodiment 200 of the input apparatus 10 (see FIG. 1) that includes a mode change mechanism 202 that is operable to selectively change the field of view of the optical sensor 14 between a first operational mode in which the field of view is free of any portion of the reference surface 20 (FIG. 13A) to a second operational mode in which the field of view includes at least a portion of the reference surface 20 (FIG. 13B).

In the first operational mode, the input system 12 is hidden inside the housing 204 and the input apparatus 200 navigates with respect to external surfaces (e.g., a desktop surface). In this process, the optical sensor 14 captures images of the external surface and the processing system 16 produces the display control signals 22 corresponding to movement of the input apparatus in relation to the external surface based on correlations of common features in successive ones of the capture images.

In the second operational mode, the input system 12 is removed from the housing 204 to a position where a user can manipulate the displaceable member 18. The input apparatus 200 responds to movements of the displaceable member 18 in the operational zone. In this process, the optical sensor 14 captures images of the tracking surface 20 and the processing system 16 produces the display control signals 22 based on correlations of common features in successive ones of the capture images in accordance with one or more of the embodiments described in detail above.

In general, the mode change mechanism 202 may be implemented by any mechanical arrangement that allows the input system 12 to be easily switched between the first and second operational modes. In the illustrated embodiment, the displaceable member 18 and the tracking surface 20 are carried by the support structure of the input system 12 and the mode change mechanism 202 includes a pivot mechanism 206 about which the support structure rotates to selectively move the tracking surface 20 into and out of the field of view of the optical sensor 14.

Figure 14A:
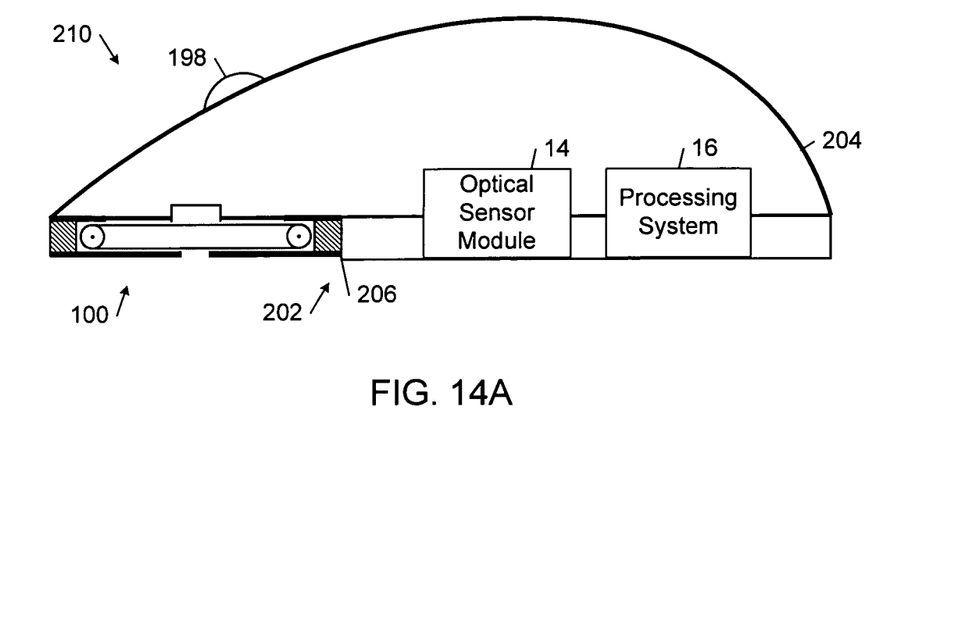
FIG. 14A is a diagrammatic cross-sectional view of an embodiment of a housing containing an embodiment of the input apparatus shown in FIG. 1.
Figure 14B:
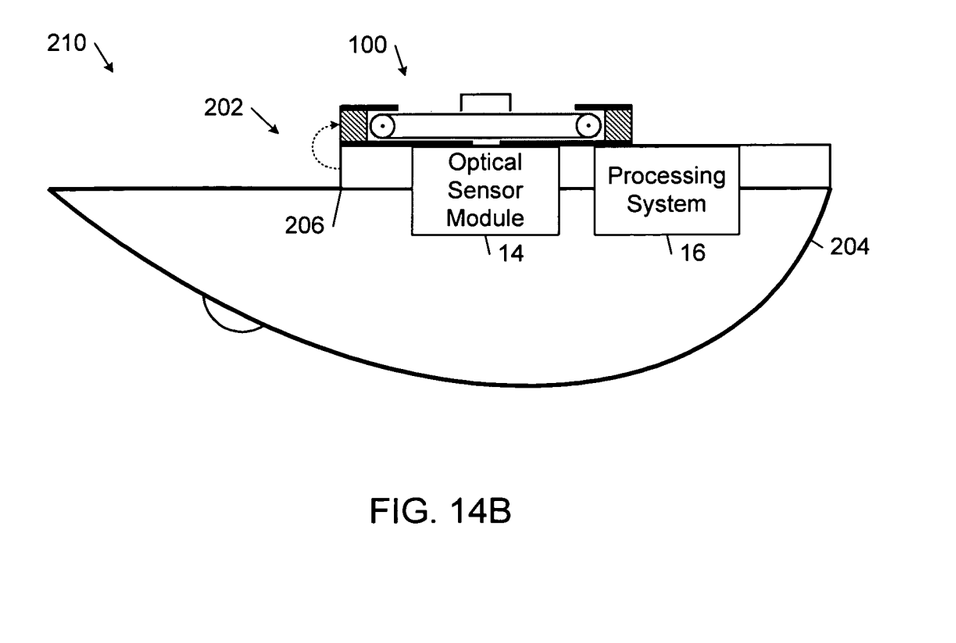
FIG. 14B is a diagrammatic cross-section view of the housing shown in FIG. 14A after the displaceable member has been re-oriented to change the input mode of operation of the input apparatus.

FIGS. 14A and 14B show an embodiment 210 of the input apparatus 10 (see FIG. 1) that corresponds to the input apparatus 200 shown in FIGS. 13A and 13B, except that the input system 12 is implemented by the input system 100 described above in connection with FIGS. 7-8C.

III. Conclusion

The embodiments that are described herein provide input apparatus and methods that are capable of sensing movement of a displaceable member with high accuracy, provide an absolute position mapping mode of input, and can be readily reconfigured to provide multiple modes of input.

Other embodiments are within the scope of the claims.

What is claimed is:

1. An apparatus, comprising:
an input system comprising a displaceable member movable in an operational zone and a tracking surface that moves in correlation with movement of the displaceable member;
an optical sensor having a field of view of at least a portion of the tracking surface during movement of the displaceable member in the operational zone and being operable to generate optical data in response to light received from the tracking surface; and
a processing system operable to produce motion measures indicative of movement of the tracking surface from the optical data;
wherein the tracking surface comprises one or more boundary patterns demarcating locations on the tracking surface that are visible in the field of view of the optical sensor when the displaceable member is positioned at corresponding boundaries of the operational zone, and the processing system is operable to detect the one or more boundary patterns;
wherein the processing system is operable to determine a current position of the displaceable member in the reference coordinate system based on the optical data; and
wherein, in response to a detection of one of the boundary patterns, the processing system compares the current position of the displaceable member with the location of the boundary corresponding to the detected boundary pattern.

2. The apparatus of claim 1, wherein the input system comprises a support structure that constrains the displaceable member to two-dimensional movement within the operational zone.

3. The apparatus of claim 1, wherein movement directions of the tracking surface and the displaceable member are identical for movements of the displaceable member along at least one axis.

4. The apparatus of claim 1, wherein movement directions of the tracking surface and the displaceable member are different for movements of the displaceable member along at least one axis.

5. The apparatus of claim 1, wherein the input system comprises a continuous belt configured to rotate about first and second rollers having respective rotational axes parallel to a first coordinate axis, the displaceable member is attached to the belt, the tracking surface is a surface of the belt, and rotation of the first and second rollers about their respective rotational axes translates to movement of the displaceable member in a direction parallel to a second coordinate axis orthogonal to the first coordinate axis.

6. The apparatus of claim 5, wherein the input system comprises first and second shafts respectively supporting the first and second rollers, and the rollers are configured to slide on the shafts along the first coordinate axis.

7. The apparatus of claim 1, wherein the optical sensor is operable to capture images of the portion of the tracking surface within the field of view and the processing system is operable to produce the motion measures from comparisons of ones of the captured images.

8. The apparatus of claim 1, wherein the processing system modifies the motion measures produced from the optical data in response to a determination that the current position fails to coincide with the boundary corresponding to the detected boundary pattern.

9. The apparatus of claim 1, further comprising a mode change mechanism operable to selectively change the field of view of the optical sensor from a first operational mode in which the field of view comprises at least a portion of the tracking surface to a second operational mode in which the field of view is free of any portion of the tracking surface.

10. The apparatus of claim 9, wherein the input system comprises a support structure carrying the displaceable member and the tracking surface and the mode change mechanism comprises a pivot mechanism about which the support structure rotates to selectively move the tracking surface into and out of the field of view of the optical sensor.

11. The apparatus of claim 9, wherein the processing system produces motion measures corresponding to absolute positions of the displaceable member in the operational zone when the mode change mechanism is in the first operational mode.

12. The apparatus of claim 11, wherein the processing system produces motion measures corresponding to movement of the apparatus in relation to an external surface when the mode change mechanism is in the second operational mode.

13. A method, comprising:
generating optical data in response to light received from a field of view of at least a portion of a tracking surface that moves in correlation with movement of a displaceable member during movement of the displaceable member in an operational zone; and
producing motion measures indicative of movement of the tracking surface from the optical data;
wherein the tracking surface comprises one or more boundary patterns demarcating locations on the tracking surface that are visible in the field of view of the optical sensor when the displaceable member is positioned at corresponding boundaries of the operational zone; and
wherein the producing comprises:
detecting the one or more boundary patterns;
determining a current position of the displaceable member in the reference coordinate system based on the optical data;
in response to a detection of one of the boundary patterns, comparing the current position of the displaceable member with the location of the boundary corresponding to the detected boundary pattern; and
modifying the motion measures produced from the optical data in response to a determination that the current position fails to coincide with the boundary corresponding to the detected boundary pattern.

14. The method of claim 13, further comprising selectively changing the field of view of the optical sensor from a first operational mode in which the field of view comprises at least a portion of the tracking surface to a second operational mode in which the field of view is free of any portion of the tracking surface.

15. The method of claim 14, wherein the producing comprises producing motion measures corresponding to absolute positions of the displaceable member in the operational zone when the mode change mechanism is in the first operational mode, and producing motion measures corresponding to movement of the apparatus in relation to an external surface when the mode change mechanism is in the second operational mode.

16. An apparatus, comprising:
- an input system comprising a displaceable member movable in an operational zone and a tracking surface that moves in correlation with movement of the displaceable member;
- an optical sensor having a field of view of at least a portion of the tracking surface during movement of the displaceable member in the operational zone and being operable to generate optical data in response to light received from the tracking surface; and a processing system operable to produce motion measures indicative of movement of the tracking surface from the optical data;

wherein the input system comprises a continuous belt configured to rotate about first and second rollers having respective rotational axes parallel to a first coordinate axis, the displaceable member is attached to the belt, the tracking surface is a surface of the belt, and rotation of the first and second rollers about their respective rotational axes translates to movement of the displaceable member in a direction parallel to a second coordinate axis orthogonal to the first coordinate axis.

17. The apparatus of claim 16, wherein the input system comprises first and second shafts respectively supporting the first and second rollers, and the rollers are configured to slide on the shafts along the first coordinate axis.

* * * * *